No. 840,606. PATENTED JAN. 8, 1907.
M. P. BUCKLEY.
DISK ATTACHMENT FOR CULTIVATORS.
APPLICATION FILED MAR. 24, 1905.
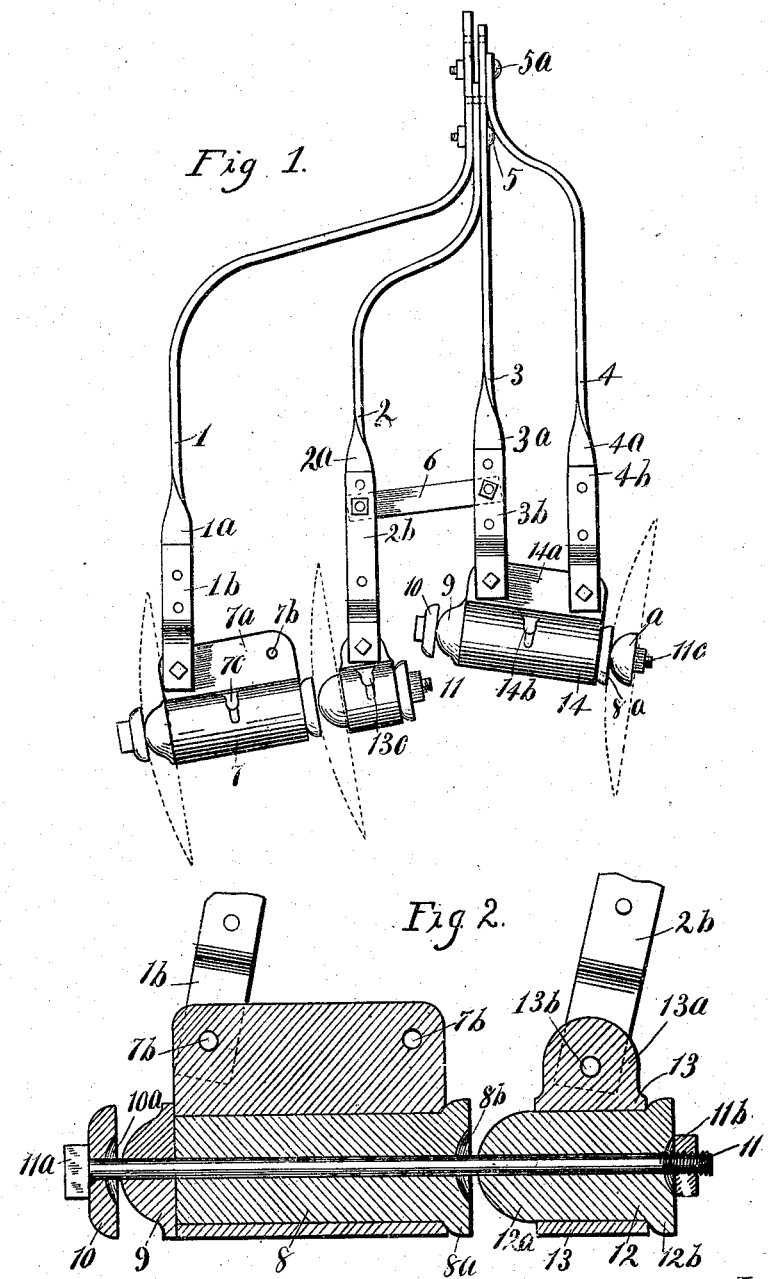

UNITED STATES PATENT OFFICE.

MATTHEW P. BUCKLEY, OF WATERTOWN, ILLINOIS.

DISK ATTACHMENT FOR CULTIVATORS.

No. 840,606.

Specification of Letters Patent.

Patented Jan. 8, 1907.

Application filed March 24, 1905. Serial No. 251,716.

*To all whom it may concern:*

Be it known that I, MATTHEW P. BUCKLEY, a citizen of the United States, residing at Watertown, in the county of Rock Island and State of Illinois, have invented certain new and useful Improvements in Disk Attachments for Cultivators, of which the following is a specification.

This invention relates to improvements in the construction and arrangement of land-cultivators, and especially to that class of cultivators in which disks are rotatably mounted; and the particular object of my improvements is to provide means for mounting and detaching a series of disks to any cultivator adapted to carry same, whereby the disks may be adjusted or set to different angles relative to each other and to the ground in which they work and may be readily detached, so that one or more can be used, as required. Having this special object and others of general utility in view, I have designed the attachment shown in the accompanying drawings, which form a part of this application, in which—

Figure 1 is a plan view of my improved disk-holding attachment; and Fig. 2 is a longitudinal section, on an enlarged scale, of the journals and bearings which form a part of my improved attachment.

Referring to the drawings in detail, 1, 2, 3, and 4, respectively, represent wrought-iron bars bent as shown and adapted to be secured together at their ends by bolts 5 $5^a$, which pass through suitable bolt-openings in the upper ends of said bars. The lower portions of said bars are twisted and flattened, as at $1^a$ $2^a$ $3^a$ $4^a$, respectively, and through such flattened portions are formed a plurality of rivet or bolt holes, as indicated. The bars 2 3 are connected together by a strap 6, the ends of which are suitably pivotally bolted to the flattened portions of said bars. As the bolts that connect the upper ends of said bars and the bolts that connect the strap, as described, are all removable, and as several holes are provided in the upper and lower portions, respectively, of said bars, it will be apparent that various relative adjustments may be made in said bars by which the position of the ends of the bars will be changed relative to each other. Riveted to the flattened portions of the said bars are straps $1^b$ $2^b$ $3^b$ $4^b$, respectively, the lower ends of which are bent outwardly so as to provide a space between said straps and the end portions of said bars. Between the ends of the bar and strap $1^a$ $1^b$, respectively, is bolted the flange $7^a$ of a journal-box 7. This box is cylindrical and has journaled therein a cylindrical bearing-block 8, one end of which is formed with an annular shoulder $8^a$, in which a concave recess $8^b$ is formed. Extending longitudinally through the bearing-block is a bolt 11, on one end of which is a head $11^a$, and the other end has a threaded engagement with a nut $11^b$. Strung on this bolt near one end is a convex washer 9 and adjacent thereto a washer 10, having a concave face $10^a$, which conforms to the curvature of the convex face of the washer 9. Mounted on the bolt 11 is a bearing-block 12, having one end convex, as at $12^a$, and on the other end formed with an annular shoulder $12^b$. This block fits loosely in a journal-box 13, which is formed with a flange $13^a$, through which extends a bolt-hole $13^b$, through which the flange is connected by a suitable bolt with the strap $2^b$ and the bar 2. The convex end $12^a$ of the block 12 conforms in curvature to the walls of the recess $8^b$ in the block 8, and it will be apparent that upon screwing up the nut $11^b$ on the rod 11 such convex end will be caused to enter said recess and at the same time a convex face of the washer 9 will be caused to enter the concave recess $10^a$ of the washer 10.

To the journal-box 7 is secured an oil-cup $7^c$ of any suitable design, and to the journal-box 13 is secured an oil-cup $13^c$, said oil-cups having passages communicating with the bores of said journal-boxes, whereby oil may be applied to the blocks 8 and 12, respectively. The flange $7^a$ of the box 7 is provided with two holes $7^b$, thus permitting an adjustable connection between said flange and the bar 1, whereby the angle at which the journal-box will be held will be changed, as will readily appear. As the connection between the flanges $13^a$ of the journal-box 13 and bar 2 is a pivotal one and as both boxes are mounted on the same bolt, the angle at which said box 12 will be held relative to the box 7 will change with the adjustment of the latter.

I have indicated by dotted lines one position of the disks when secured in the bearings above described; but it will be apparent that by reversing the positions of the boxes 8 and 12, or either of them, so that the convex end of the block 12 or the convex face of the washer 9 will be changed, other adjustment or arrangement of the disks may be effected, it being understood that the convex bearing-surfaces named project against the concave side or face of the ordinary disk.

Secured to the lower ends of the arms 3 4 and between the straps 3<sup>b</sup> 4<sup>b</sup> and the ends of said bars is a journal-box 14, having a flange 14<sup>a</sup> and oil-cup 14<sup>b</sup> and in all respects made exactly like the journal-box 7. Extending through this box is a bolt 11<sup>c</sup>, on which are strung washers 9 and 10, which correspond in shape and function to similar parts on the bolt 11. In this bearing I have shown but one disk mounted; but it will be apparent that two disks may be applied with the arrangement shown, and by adjustment of the connection of the bar 4 or the bar 3, as may be desired, at the upper end of the same the disk or disks may be held at different angles. The strap 6, being loosely pivoted on the bars 2 3, will permit the latter to move independently of each other in a vertical plane, but will hold them against lateral movements.

I have not shown any method of connecting my attachment to a cultivator-frame or other machine on which it may be desired to use said attachment, as same forms no part of my invention.

Having thus described my invention, what I claim as new, and desire to secure by Letters Patent, is—

1. Means for supporting rotating disks consisting of a plurality of bars adapted to be adjustably secured together, said bars having journal-boxes connected with their outer ends, each of said boxes having a journal-block rotatably mounted therein, and said blocks provided with concave and convex end portions respectively, bolts passing through said blocks and washers mounted on said bolts, said washers provided with recesses, substantially in the manner and for the purpose set forth.

2. In means for supporting rotating disks, bars adjustably secured together at one end, each of said bars having adjustably connected with its free end disk-carrying devices consisting of a journal-box, a bearing-block rotatably mounted in each box and having a convex bearing at one end and a concave bearing at the other end, a shaft or bolt extending through said block, and means for clamping the disks against the end bearings of the blocks.

In testimony whereof I affix my signature in presence of two witnesses.

MATTHEW P. BUCKLEY.

Witnesses:
G. C. WENGER,
JAMES F. MURPHY.